United States Patent [19]

Thomas et al.

[11] Patent Number: 5,144,643

[45] Date of Patent: Sep. 1, 1992

[54] IMPROVED VISUAL AID FOR VLF MSK SIGNALS

[75] Inventors: Lynn K. Thomas; Paul A. Singer, both of San Diego, Calif.

[73] Assignee: The United States of America as represented by the Secretary of the Navy, Washington, D.C.

[21] Appl. No.: 543,904

[22] Filed: Jun. 26, 1990

[51] Int. Cl.⁵ ..................... H04B 03/46; H04B 17/00
[52] U.S. Cl. ......................................... 375/10; 375/75; 324/77 B; 455/226.1
[58] Field of Search ................. 375/10, 75; 324/77 B, 324/77 R, 83 R; 455/226, 67; 371/20.1, 20.4; 364/481

[56] References Cited

U.S. PATENT DOCUMENTS

| | | | |
|---|---|---|---|
| 3,154,741 | 10/1964 | Attwood | 455/226 |
| 3,808,528 | 4/1974 | Nugent et al. | 324/77 R |
| 3,992,617 | 11/1976 | Elostein | 375/90 X |
| 4,020,283 | 4/1977 | Elostein | 375/90 |
| 4,028,490 | 6/1977 | Elostein | 375/90 |
| 4,072,905 | 2/1978 | Keely | 329/302 |
| 4,085,367 | 4/1978 | Williams et al. | 455/226 X |
| 4,153,884 | 5/1979 | Ikeguchi et al. | 331/1 A |
| 4,414,675 | 11/1983 | Comroe | 375/47 |
| 4,852,123 | 7/1989 | Bockley et al. | 375/9 |
| 5,034,963 | 7/1991 | Singer | 375/75 X |

Primary Examiner—Benedict V. Safourek
Assistant Examiner—Tesfaldet Bocure
Attorney, Agent, or Firm—Harvey Fendelman; Thomas Glenn Keough

[57] ABSTRACT

A visual display system provides patterns for visually aiding an operator in determining the nature and noise environment of the incoming signal. A conventional signal receiver and an oscilloscope are coupled to a phase detector, a clock circuit and a frequency synthesizer. The clock circuit synchronizes the operation of the receiver, phase detector and frequency synthesizer. The phase detector includes a digital delay means for imparting a digital time delay between two signals and has two outputs connected to the X and Y deflection terminals of the oscilloscope screen for effecting a display in a lissajous form and another, third output connected to the Z terminal to vary the intensity of a part of the screen such that patterns are generated on the oscilloscope that might represent the inherent nature of the incoming signal which might include, the type of noise, the presence of doppler shift or CW interference, or drift of a component.

9 Claims, 5 Drawing Sheets

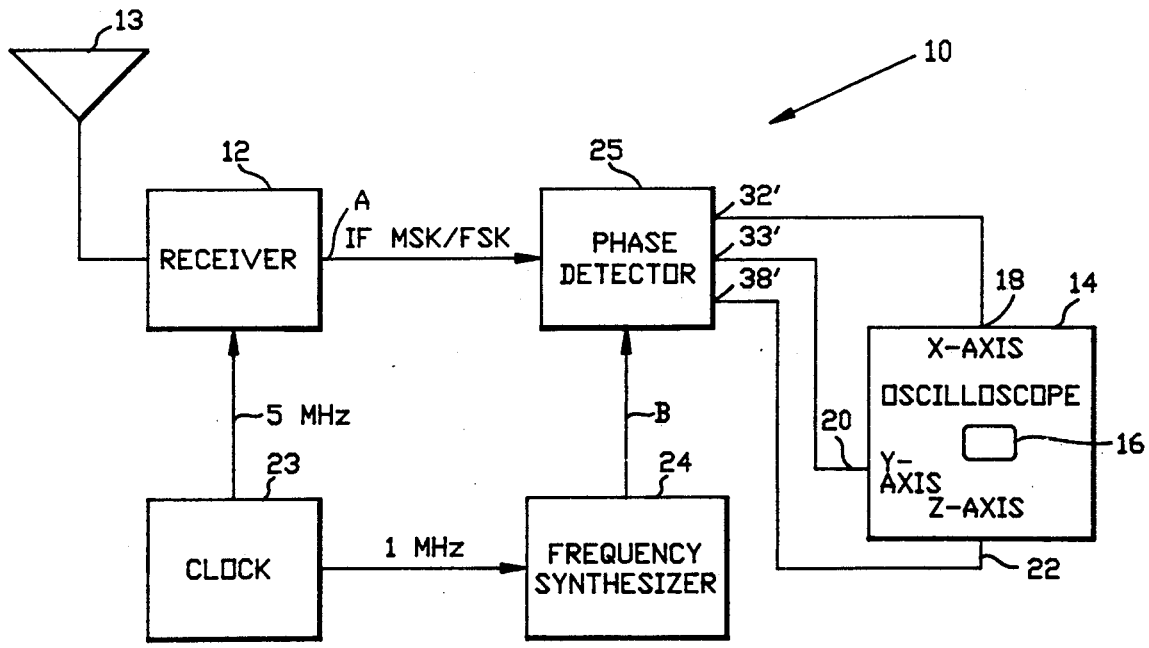

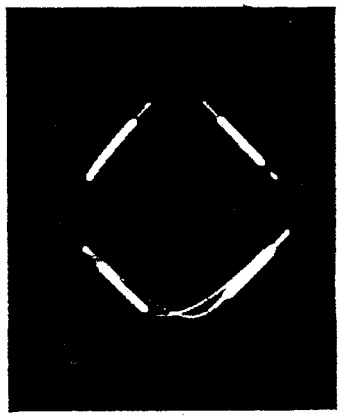
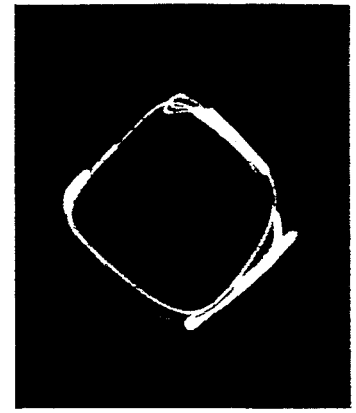
FIG. 5a            FIG. 5b            FIG. 5c
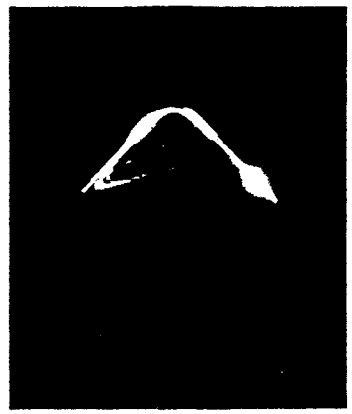
FIG. 5d            FIG. 5e            FIG. 5f

VISUAL AID FOR VLF MSK SIGNALS

STATEMENT OF GOVERNMENT INTEREST

The invention described herein may be manufactured and used by or for the Government of the United States of America for governmental purposes without the payment of any royalties thereon or therefor.

CROSS REFERENCE TO RELATED APPLICATION

This is related to a copending U.S. Pat. application, issued as U.S. Pat. No. 5,034,963, which is entitled "Apparatus For Visually Aiding MSK Detection and Interference Recognition and Classification" filed June 14, 1990 by Paul A. Singer.

BACKGROUND OF THE INVENTION

Improvements in communications continue to be needed which help in the detection of a signal of interest and in the discernment of noise and its make up. In particular, the operators of very low frequency (VLF) systems are alert for ways to improve their performance since systems of this type have been useful to convey high priority information. Any delays in recognizing information and various interferences might have dire consequences so the need is apparent for an apparatus that visually aids an operator in making a rapid analysis of incoming signals, such as VLF, and, more particularly, the detection, interference recognition and classification of minimum shift keying (MSK) signals and/or frequency shift keying (FSK) signals in incoming VLF signals.

Because a VLF receiving terminal operator with possibly little previous knowledge about a signal of interest monitors a console for, sometimes, long periods of time, errors are always a possibility. One attempt to aid in detection in the prior art relies upon the use of previously trained operators who listen to audio outputs and develop an "ear" for judging the incoming signal traffic. A main drawback of this approach is that its success is contingent solely upon the level of operator skill which usually is found to vary from one individual to the next. Furthermore, an audio monitoring of appropriately shifted signals for a period of time will tend to become tedious and fatigue is likely with its attendant compromise of performance.

Another prior art approach to improve performance is to give an operator a visual indication by employing a spectrum analyzer to "see" the frequency characteristic of the environment. Drawbacks of this approach are that considerable expensive equipment is required to produce a relatively slow response.

Thus, a continuing need exists in the state of the art for a more accurate, cost effective visual monitoring of signals of interest to aid a receiving terminal operator in the task of determining the nature and noise environment of the incoming signals and the identifying of the signals of interest.

SUMMARY OF THE INVENTION

The present invention is directed to providing a more accurate and cost effective visual display system for visually aiding an operator in the detection of MSK/FSK signals and interference signal recognition and classification thereof in an incoming VLF signal. Low cost for the capability is assured by including some of its expensive components, i.e. a VLF receiver, frequency time standard and oscilloscope, which are already at a VLF receiving station to function in their intended roles. A conventional signal receiver and an oscilloscope are coupled to a phase detector, a clock circuit and a frequency synthesizer. The clock circuit synchronizes the operation of the receiver, phase detector and frequency synthesizer. The phase detector has a digital delay means for imparting a digital time delay between two signals and has two outputs connected to the X and Y deflection terminals of the oscilloscope screen for effecting a display in a lissajous form and another, third, output connected to the Z terminal to vary the intensity of a part of the screen such that patterns are generated on the oscilloscope that might represent the inherent nature of the incoming signal which might include, the type of noise, the presence of doppler shift or CW interference, or drift of a component.

An object of the invention is to provide a visual display system which provides a visual output for aiding a receiver operator.

Another object of the invention is to provide a visual display system which provides a visual indication of signals of interest.

Another object of the invention is to provide a visual display system for generating patterns on an oscilloscope screen which visually aid the operator in determining the nature and noise environment of an incoming signal.

Still another object of the invention is to provide a cost effective visual display system which advantageously includes other components already available in the signal receiving system where the invention will be used.

A further object of the invention is to disclose a visual display system which is uncomplicated to improve reliability, has a quick response to change and is cost effective.

A further object is to provide for improved visual indications of the nature of a signal of interest by the inclusion of digital phase detector means.

These and other objects of the invention will become more readily apparent from the ensuing specification and appended claims when considered in conjunction with the accompanying drawings.

BRIEF DESCRIPTION OF THE DRAWINGS

FIGS. 5a, 5b, 5c, 5d, 5e and 5f are representative patterns generated on the screen of the oscilloscope of an MSK signal with varying amounts (increasing) of CW jamming interference.

DETAILED DESCRIPTION OF THE INVENTION

Figure 1:
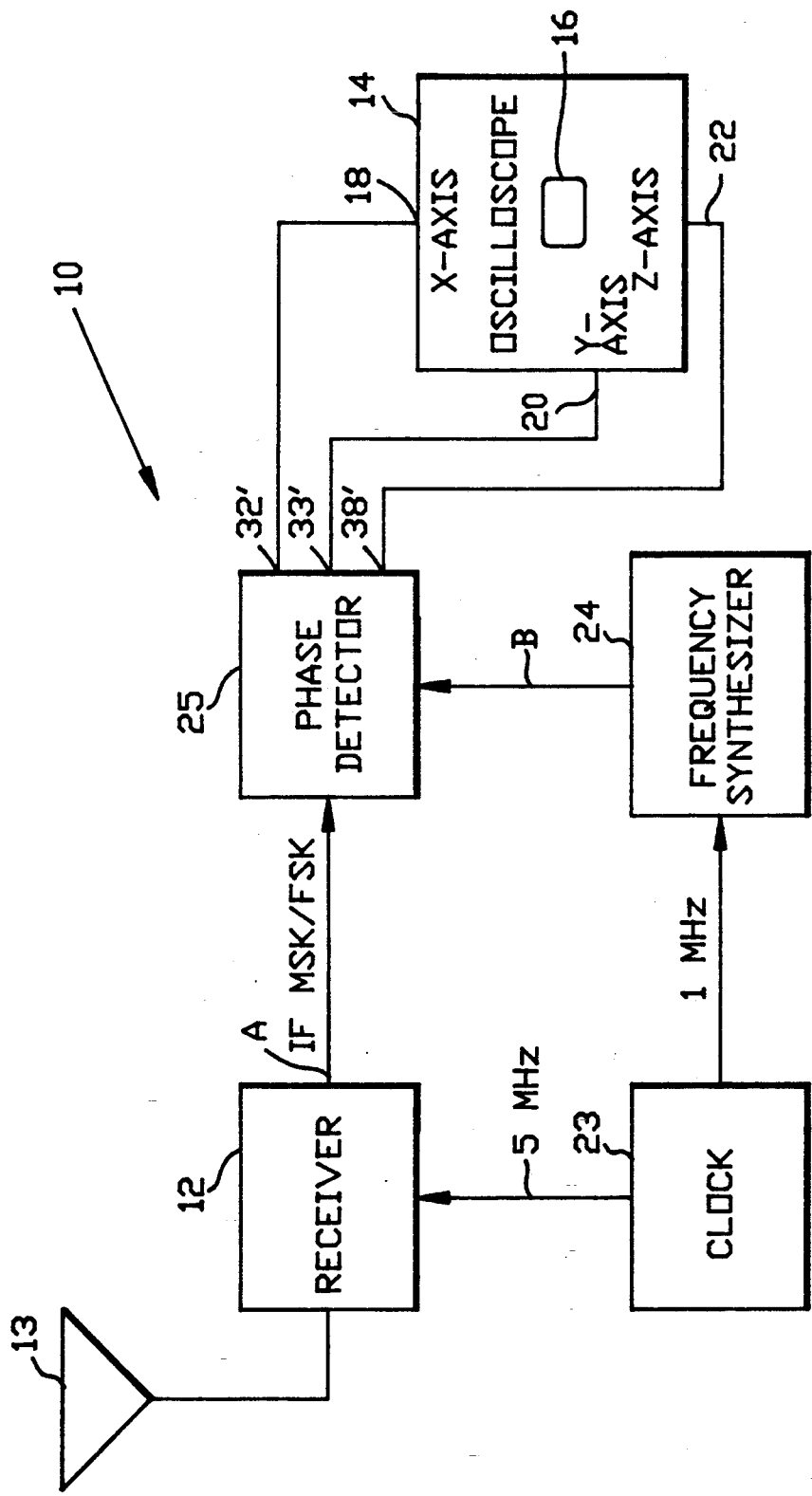
FIG. 1 is a block diagram of a visual display system fabricated in accordance with the teachings of this inventive concept.

Referring now to FIG. 1 of the drawings, a visual display system 10, is fabricated to visually aid a radio receiving terminal operator in determining the nature and noise environment of an incoming signal of interest. Its use to aid an operator receiving VLF signals, particularly in MSK/FSK detection and interference recognition and classification, will herein be elaborated on. While MSK/FSK signals in the VLF spectrum are herein discussed, it is understood, however, that in accordance with the principles of the present invention, many receivers of a variety of spectrums with other modulation schemes could advantageously employ this concept with appropriate modifications apparent to those versed in the communications arts.

Visual display system 10 is fabricated to rely on the utilization of some of the most costly components which are already included at a receiver station. These include a VLF signal receiver 12 for receiving an incoming signal via an antenna 13, and (to convert to an intermediate frequency A, e.g. at 7.5 KHz) and an oscilloscope 14. The receiver could use any one of a variety of commercially available models, such as for example, a Type Number R-1738/WR marketed by Rockwell Corporation of Richardson, TX 75018 and the antenna chosen could be any of many compatible designs.

Oscilloscope 14 has a display screen 16 that appropriately displays the information fed to the oscilloscope on an X deflection input terminal 18, a Y deflection input terminal 20 and a Z deflection input terminal 22 for defining X, Y and Z information display axis thereon. The oscilloscope may be one selected from numerous suppliers but the unit selected must have the capability to provide the X and Y information on orthogonal axes and the Z axis information by being able to change its intensity.

The visual display system has a clock circuit 23 for assuring proper operation. A frequency time standard unit marketed as a Model 0-1695/U by Hewlett-Packard Corporation, Palo Alto, CA 94303 was selected to provide the appropriate 5 Mhz. signal to receiver 12 and a 1 MHz. signal to a frequency synthesizer 24 to function as a frequency reference standard.

A typical frequency synthesizer 24 used in accordance with the teachings of this inventive concept might be a Model 3338C marketed by Hewlett-Packard Corporation, Palo Alto, CA 94303. The frequency synthesizer provides a frequency locked signal at 15 KHz., the reference signal B which is two times the 7.5 KHz. intermediate frequency A of receiver 12.

In other words, a typical VLF receiver 12 is used to translate the incoming VLF signal to an intermediate frequency A (e.g. at 7.5 KHz). The receiver timing is locked to the 5 MHz. frequency time standard of clock 23. The IF output A of the receiver is fed into a phase detector 25. The phase detector is also coupled to receive the 15 KHz.reference intermediate frequency B from frequency synthesizer 24 which is also timing locked via the 1MHZ. signal from clock 23. Since the frequency synthesizer supplies a signal which is twice the IF frequency of the receiver, it is used for a phase standard in phase detector 25.

Figure 2:
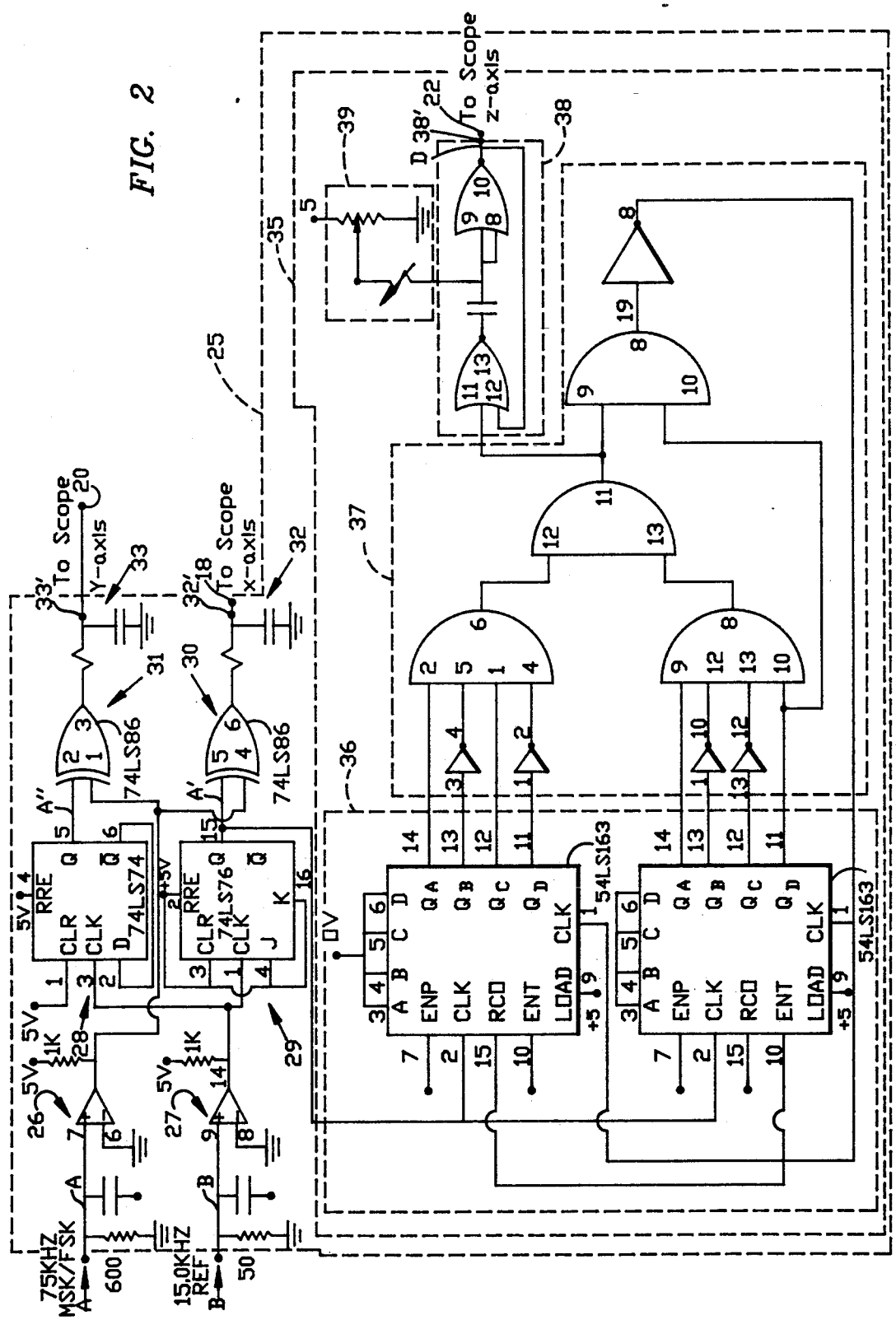
FIG. 2 is a schematic representation of some of the constituents of FIG 1.

Looking to FIG. 2, the two signals A and B that are supplied to phase detector 25 are each supplied to a zero crossing comparator 26 and 27, respectively, which convert the signals into rectangular TTL waveforms for digital processing. The converted reference signal B supplied from frequency synthesizer 24 is fed into two flip-flops 28 and 29 which are appropriately configured to create an in-phase intermediate frequency reference signal A' and a quadrature intermediate frequency reference signal A" of intermediate frequency A of receiver 12. Signals A' and A" are 90° out of phase with respect to one another and the accurate and predictable digital delay is effected in accordance with techniques, such as appropriate interconnections and digital component selections, that are well known in the art. Other digital delays could be selectably created by appropriate expedients practiced by those versed in these arts who have the teachings of this invention before them.

In-phase intermediate frequency reference signal A' and quadrature intermediate frequency reference signal A" from the two flip-flops 29 and 28, each are coupled into one input of two exclusive-or gates 30 and 31, respectively. The other input of the exclusive-or gates are fed by the TTL version of the VLF signal from comparator 26. At this time it should be pointed out that other suitable time delays for other intermediate frequencies of interest can be created as needed by appropriate selection and interconnections of components by one skilled in the art in accordance with the teachings of this inventive concept.

Since the references A' and A" each are coupled to only one input of a separate one of exclusive-or gates 29 or 28 and the VLF signal A is fed to the other input of both exclusive-or gates, the gates can compare the two inputs and yield an output that is proportional to the phase difference between the in-phase reference A' and the VLF signal A and the quadrature-phase reference A" and the VLF signal A, respectively.

The outputs of exclusive-or gates 30 and 31 are TTL signals where the phase information is located in the pulse widths; therefore, in order to present the information on oscilloscope 14, the pulse width information must be converted into integrated amplitude information. This is accomplished by using a simple RC integrator 32 or 33 at the output of each of exclusive-or gates (30 and 31).

The integrated amplitude signals are supplied to output ports 32' and 33' which are connected to oscilloscope X deflection input terminal 18 and Y deflection input terminal 20. With these inputs the oscilloscope can now display the phase information, in XY mode, in a lissajous form as depicted in the patterns of FIGS. 3, 4 and 5.

Phase detector 25 also includes a blanking circuit 35 that produces a blanking signal pulse D of adjustable width every 20 ms, which is an integer multiple of the information period. The blanking circuit includes a counter 36 connected to logic gates 37 and a one-shot multivibrator 38 with a variable impedance 39 that is fabricated and interconnected as shown in FIG. 2. Changing the magnitude of the variable impedance, possibly a resistor, modifies the intensity of the image on the screen of the oscilloscope by the presetting of the preselected time duration of operation of the timing signal. Blanking signal pulse D signal is coupled to Z input terminal 22 of oscilloscope 14 to control the intensity of the oscilloscope trace. The blanking signal pulse helps identify the presence of doppler shift and CW jamming in the received VLF signal by showing a rotation of the intensified sections of the trace pattern. The trace pattern would normally be stationary if no doppler shift or CW jamming were present.

An observation of the visual display of typical received signals enable an appreciation of the salient features of this inventive concept, see FIGS. 3, 4 and 5. Pseudo-random MSK and FSK signals of 200 bps and 50 bps, respectively, at a frequency of 22.1 KHz, (the frequency that the receiver 12 is set to receive) along with white gaussian noise or a CW tone at 22.1 KHz. was received and supplied to receiver 12.

Figure 3A:
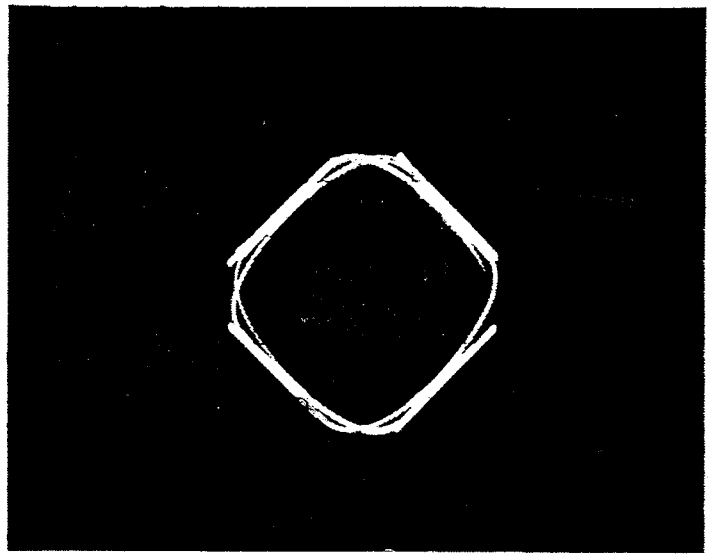
FIGS. 3a and 3b respectively depict patterns generated on a screen of an oscilloscope when only the MSK or FSK signals of interest are being received and viewed (with no interference or noise).
Figure 3B:
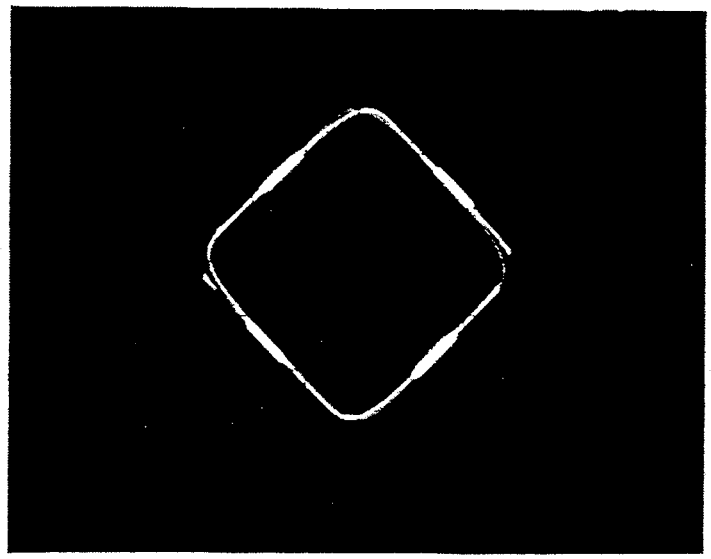

At first, a pure MSK and then a pure FSK signal were supplied to receiver 12 and the output was viewed on oscilloscope 14. FIGS. 3a and 3b show the pattern display on the screen of the oscilloscope of an MSK and an FSK signal in a noise-free environment. The lighter areas of the trace are caused by blanking signal pulses D of blanking circuit 35 and signify the four separate channels of the signal.

For a pure signal the lighter areas of the trace remain stationary. As noted in FIG. 3a, for the MSK signal, a trace reversal is visible at all four corners of the trace (trace reversals are shown at the sides in FIG. 3b). For the FSK signal of FIG. 3b, the trace reversals only occur at two of the four corners of the trace. A clockwise trace was observed to denote the upper frequency and a counter clockwise trace was observed to denote the lower frequency. The difference in the pattern traces of the two types of signals, MSK and FSK, is due to the fact that the FSK signal has a factor of two larger change in frequency from the center to the upper and lower frequencies than does the MSK signal and, therefore, introducing twice as much phase difference during the bit period.

Figure 4A:
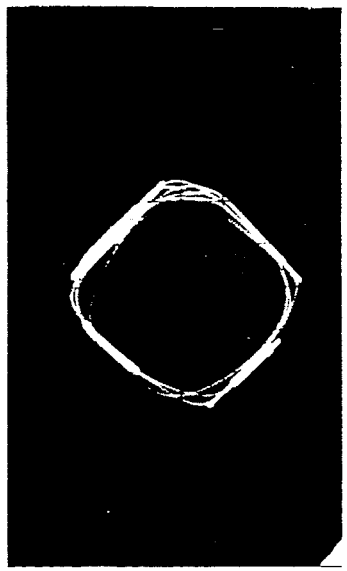
FIGS. 4a, 4b, 4c, 4d and 4e are representative patterns generated on the screen of the oscilloscope of an MSK signal with increasing amounts of white Gaussian noise.
Figure 4B:
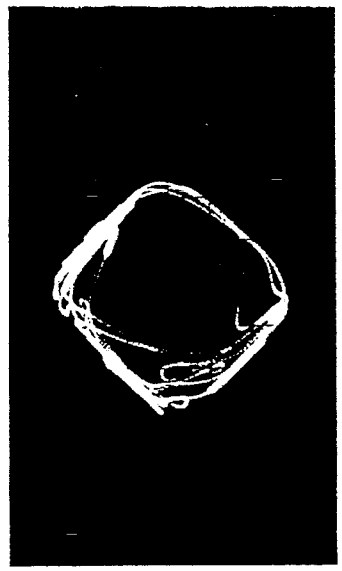
Figure 4C:
Figure 4D:
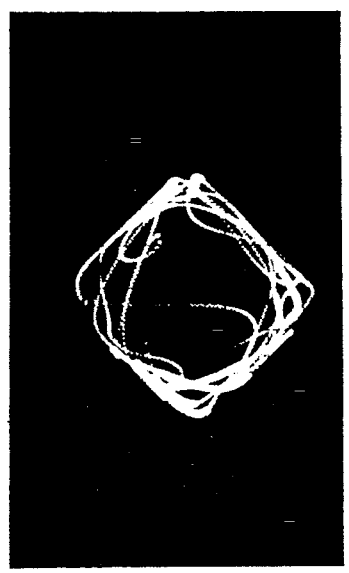
Figure 4E:
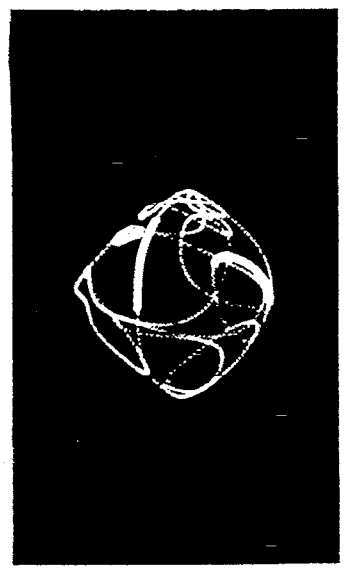

Mixing an MSK signal and increasing amounts of white gaussian noise and viewing the output on oscilloscope 14 over a range of signal-to-noise ratios (S/N) provided the pattern traces of FIGS. 4a. through 4e for signal-to-noise ratios of 14.75 dB, 9.75 dB, 4.5 dB, −0.75 dB and −5.75 dB, respectively. The signal-to-noise ratio was adjusted through a range of 1 dB to −15 dB. The increasing amounts of white gaussian noise has an increasing tendency to wash out the phase information in the phase detector; therefore, with signal-to-noise ratios of less than about 4 dB it was noted that this configuration of the invention is unable to detect the phase information of the original MSK signal. Appropriate adaptations by one skilled in the art could further improve this capability.

FIGS. 5a through 5f show trace patterns observed on oscilloscope 14 when an MSK signal was mixed with increasing amounts of CW tone interference set to the same frequency as the center frequency (22.1 KHz) of the VLF signal received at receiver 12. The observed patterns for FIGS. 5a through 5f for MSK signal to CW jamming ratios of 20 dB, 10 dB, 4.4 dB, 2 dB, 0 dB and −3 dB, respectively. This confirms the operating range of the device in a CW jammed environment.

Because the CW tone is not frequency locked to the incoming MSK signal, the frequency will have a tendency to drift. This drift causes the lighter parts of the trace to rotate clockwise if the interference frequency is higher than the center frequency and counter clockwise if it is lower than the center frequency. This effect becomes more pronounced with decreased signal-to-jammer ratios. Most of the phase information of the original MSK signal is lost at signal to jammer ratios below 0 dB.

When the signal-to-noise ratios stay above about 0 to 5 dB the visual display system gives a qualitative idea to the user of the nature of the incoming signal. It provides a low-cost device and method of viewing a VLF signal because most of the using systems have the most costly equipment already installed to be responsive to the communications requirements.

By way of this example which is intended to be for the purposes of demonstration only and is not to be construed as being limiting, VLF signal receiver 12 produces an intermediate frequency or frequency of interest output signal A that may be at 7.5 KHz. Other frequencies of interest may be accommodated as well as other modulation schemes within the scope of this inventive concept The representative patterns which are generated on the oscilloscope screen represent the type of noise, the presence of doppler shift or CW interference, and the inherent nature of the incoming signal. Such patterns are capable of visually aiding the receiving terminal operator in determining the nature and noise environment of the incoming signal.

The invention and many of its attendant advantages will be understood from the foregoing description and it will be apparent that various changes may be made in the form, construction and arrangement of the parts thereof without departing from the spirit and scope of the invention.

I claim:

1. An apparatus for visually aiding a receiving terminal operator in determining the nature and noise environment of an incoming signal by visually displaying patterns thereof comprising:

means for providing a clock;

a signal receiving means having a first receiver input coupled to the clock providing means and a second receiver input for receiving an incoming signal to provide a signal of interest at a receiver output;

means for providing a display on X, Y and Z axes having an X deflection signal input, a Y deflection signal input and a Z deflection signal input;

synchronization providing means having a synchronization providing means input coupled to said clock providing means and a synchronization providing means output; and phase detector means each having a first phase detector input and a second phase detector input and a first phase detector output, second phase detector output and third phase detector output, said first phase detector input of said phase detector means being connected to said receiver output of the said signal receiving means and said second phase detector input being connected to said synchronization providing means output, said first phase detector output of said phase detector means being connected to said X deflection signal input of the display providing means and said second phase detector output of said phase detector means being connected to said Y deflection signal input of said display providing means for effecting a display in a lissajous form on said display providing means, said phase detector means also including said third phase detector output being connected to said Z deflection signal input of said display providing means for effecting a timing signal of a preselected time duration to vary the intensity of a preselected part of said display in a said lissajous form on said display providing means, said phase detector means includes a means for digitally delaying to provide a suitable phase shift of one signal with respect to another to assure said effecting said display in said lissajous form.

2. The apparatus according to claim 1 in which the digitally delaying means is a digital delay line suitably tailored to provide an appropriate delay for a particular reference intermediate signal.

3. The apparatus according to claim 2 in which said digitally delaying means is a digital delay line suitably tailored to provide a 90° shift.

4. The apparatus according to claim 3 in which said phase detector means includes a counter, logic gates and a one-shot multivibrator connected in a serial arrangement between said synchronization providing means and said Z deflection signal input of said display providing means.

5. The apparatus according to claim 4 in which said phase detector means includes an adjustable means for presetting a preselected time duration of operation of said timing signal.

6. The apparatus according to claim 5 in which said adjustable means is a variable impedance, the changing of the magnitude of which modifies the intensity of the image on said display providing means.

7. The apparatus of claim 6 in which said phase detector means includes two exclusive-OR circuits.

8. The apparatus according to claim 7 wherein said display providing means defining means is an oscilloscope having a display screen.

9. The apparatus according to claim 8 in which said clock providing means is a frequency time standard clock circuit.

* * * * *